Jan. 9, 1923.
C. W. DAKE.
VALVE FOR STEAM TURBINES.
FILED FEB. 14, 1919.
1,441,485
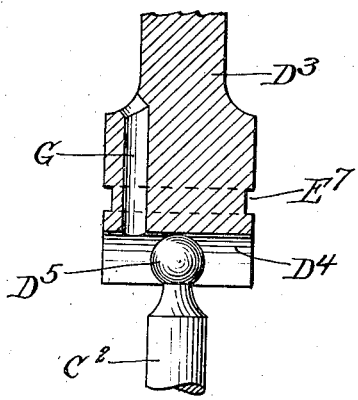
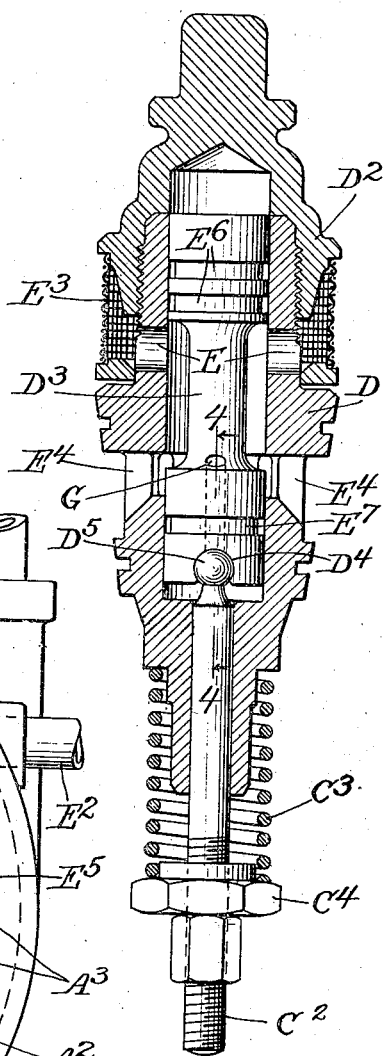
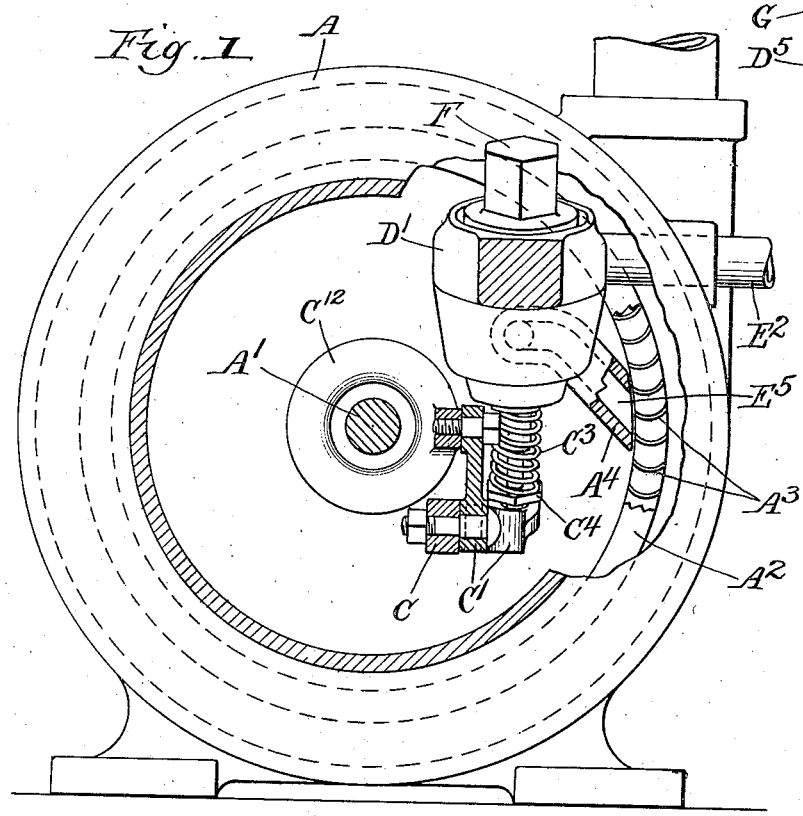
Witness,
Edward T. Wray.
Inventor.
Charles W. Dake.
by Parks & Carts
Attorneys.

Patented Jan. 9, 1923.

1,441,485

UNITED STATES PATENT OFFICE.

CHARLES W. DAKE, OF CHICAGO, ILLINOIS, ASSIGNOR TO THE PYLE-NATIONAL CO., OF CHICAGO, ILLINOIS, A CORPORATION OF NEW JERSEY.

VALVE FOR STEAM TURBINES.

Application filed February 14, 1919. Serial No. 276,883.

*To all whom it may concern:*

Be it known that I, CHARLES W. DAKE, a citizen of the United States, residing at Chicago, in the county of Cook and State of Illinois, have invented a certain new and useful Improvement in Valves for Steam Turbines, of which the following is a specification.

My invention relates to improvements in governor-controlled valves for steam turbines and the like and is particularly applicable for use in connection with compact, light, high speed, locomotive electric headlight generator sets, though obviously it might be used in connection with any steam turbine.

One object of the invention is to provide a new and improved form of valve which will be peculiarly sensitive and accurate and rapid in its operation, to the end that when the governor operates in response to sudden speed changes, an immediate response in the control of the motive fluid will follow.

My invention is therefore more or less diagrammatically illustrated in the accompanying drawings wherein—

Figure 1 is a vertical cross section through a turbine showing the valve mounting.

Figure 2 is a detailed section through the valve and valve stem;

Figure 3 is a section along the line 4—4 of Figure 2.

Like parts are indicated by like characters in all the figures.

A is a turbine housing. $A^1$ is a turbine shaft supported by suitable bearings not here shown. $A^2$ is a turbine wheel keyed on the shaft and having buckets $A^3$ on one face thereof. $A^4$ is a steam nozzle adapted to discharge steam against said buckets.

C is a bracket on the wall of the housing A. Pivoted on this bracket is a bell crank lever $C^1$ having one arm carrying a movable collar $C^{12}$. The other arm of the lever engages the end of a valve stem $C^2$ which stem is normally held in the downward or valve open position by a spring $C^3$ surrounding the stem and engaging an adjustable nut $C^4$.

D is a tapered removable valve socket adapted to be contained within a steam distribution housing $D^1$. This valve socket is provided with a screw threaded cap $D^2$ and contains a dumb bell shaped balanced piston valve $D^3$ slidable within the socket. The base of this valve $D^3$ has a transverse bore or slot $D^4$ open along one side. $D^5$ is a ball on the end of the valve stem $C^2$, engaged within said bore so that though relative movement of the stem and valve in a direction parallel with their axis is completely prevented, the valve stem and valve are free to change their relative angles of inclination or to move laterally with respect one to another. This gives what is in effect, a universal joint between the valve stem and the valve; and makes binding of one or the other, substantially impossible. In order to place the valve in position, the stem is first engaged with the valve and then the valve is dropped into the socket, after the valve and stem have been brought into working relation with the ball on the stem engaging in the slot in the valve. The cylindrical valve seat is then closed at the top by the cap $D^2$ thus making a tight gas chamber above the valve and permanently, during the operation at least, holding the valve in its seat.

E E are ports through which the steam comes from a steam channel $E^2$, being strained by screens $E^3$ into the space surrounding the reduced portion of the valve. $E^4$ are ports communicating with such space adapted to permit exit of the steam to the nozzle through the passage $E^5$. The relation of the parts is such that the passages E are always open and the cut-off is made in the ports $E^4$. In the position shown, the ports $E^4$ are half closed; movement of the valve upward would completely close them and downward, would open them. Attention is called to the channels $E^6$ $E^7$ above and below the point where the steam is controlled by the valve. These channels take the form merely of annular depressions in the valve, which serve as condensation chambers and thus provide a water packing for the valve. In any event, if the steam pressure is held between these channels, the valve will be balanced by the pressure on the two ends of the dumb bell.

The socket is held in a tapered seat by a large cap F which encloses all the parts and is screwed home so as to bring pressure to bear upon a spring (not shown) between the cap and valve socket. It is this spring which seats the valve socket in its seat.

G is a steam passage through the lower portion of the valve whereby steam may find its way from the central portion of the valve down to the lower end so as to equalize the pressure on both ends of valve. The idea being that steam leaks past the upper end of the valve into a closed chamber as shown, and so cannot get away; but steam can escape along the valve stem and means must be provided to supply steam to the lower end of the valve more rapidly than it can escape.

It will be evident that while I have shown in my drawings an operative device, still many changes might be made both in size, shape, and arrangement of parts without departing materially from the spirit of my invention, and I wish therefore that my drawings be regarded as in a sense diagrammatic.

The use and operation of my invention are as follows:—

The valve plunger and valve stem are first assembled, then slipped into place in the valve socket so as to move smoothly and freely therein. The cap is then screwed down over the valve socket locking the screen ring in place. The valve spring is then placed around the lower end of the socket and brought under compression by means of the adjusting nut so that the spring normally holds the valve in the lower open position. The valve socket is then dropped into its housing or seat. Passages or channels (not shown) in the seat extend clear around. Angular position of the valve is of no consequence. The outside cap is then screwed home compressing the spring between the cap and valve socket, and the valve is in place in the housing with the lower end of the stem engaging one arm of the bell crank lever.

Claims:

1. A valve having a flat end perpendicular to the line of movement thereof with a transverse cylindrical slot therein the distance between the central axis of the slot and the end being less than the radius of the slot.

2. A valve having a flat end perpendicular to the line of movement thereof with a transverse cylindrical slot therein the distance between the central axis of the slot and the end being less than the radius of the slot, and a valve stem having a ball on the end thereof adapted to fit within said slot.

3. A valve and valve stem separate, one from the other, a rotatable and laterally movable connection between them, comprising a ball on the end of the stem and a cylindrical slot on the valve in which the ball is seated.

4. A valve and valve stem separate, one from the other, a rotatable and laterally movable connection between them, comprising a ball on the end of the stem and a cylindrical slot on the valve in which the ball is seated and seats for valve and stem arranged to hold them in operative relation and prevent their disconnection.

5. The combination with a valve of a cylindrical ported seat therefor, a valve stem and means for reciprocating it, a bearing in which the valve stem is slidably mounted in line with the valve and a universal joint between the valve and valve stem arranged to permit relative lateral movement of one with respect to the other.

6. The combination with a cylindrical sliding valve of a valve stem in line therewith, the valve stem being necked down at its end and terminating in a member larger in diameter than the reduced diameter of the stem, a lateral passage in the end of the valve member whose width at the end of the valve member is less than its width in the body of the valve, the enlargement on the valve stem being located within this passage, the valve stem and valve being thereby held against longitudinal separation while free to move laterally and to rotate with respect to each other.

In testimony whereof, I affix my signature in the presence of two witnesses this 24th day of January, 1919.

CHARLES W. DAKE.

Witnesses:
EDNA B. PETERSON,
MARION L. INGRAHAM.